United States Patent [19]

Go

[11] 3,707,884

[45] Jan. 2, 1973

[54] METHOD AND DEVICE FOR POWER TRANSMISSION TRANSFER

[75] Inventor: Junichi Go, 18 Nakasu-machi, Gifu Japan

[22] Filed: Nov. 20, 1970

[21] Appl. No.: 91,558

Related U.S. Application Data

[63] Continuation-in-part of Ser. No. 859,665, Sept. 22, 1969, abandoned.

[52] U.S. Cl. .........................74/372, 192/44, 192/47
[51] Int. Cl. ...........................F16h 3/10, F16d 41/07
[58] Field of Search ....74/371, 372, 373; 192/38, 47, 192/43, 43.1, 44

[56] References Cited

UNITED STATES PATENTS

| | | | |
|---|---|---|---|
| 1,102,427 | 7/1914 | Morgan | 74/372 |
| 1,726,329 | 8/1929 | Aiken | 192/47 |
| 1,941,963 | 1/1934 | Wise | 74/372 |
| 1,984,490 | 12/1934 | North | 192/43 |
| 2,104,320 | 1/1938 | Fischer | 192/44 |
| 2,698,545 | 1/1955 | Pethybridge | 74/371 X |
| 3,067,626 | 12/1962 | Doerries et al. | 74/372 |
| 3,365,914 | 1/1968 | Asher | 192/44 |

FOREIGN PATENTS OR APPLICATIONS

| | | | |
|---|---|---|---|
| 814,486 | 3/1937 | France | 74/373 |

*Primary Examiner*—Carlton R. Croyle
*Assistant Examiner*—Thomas C. Perry
*Attorney*—Wenderoth, Lind & Ponack

[57] ABSTRACT

A change speed device for power transmission, including, in one form, parallel input drive and output driven shafts, each having preferably a plurality of axially spaced, different diameter interengageable members preferably in the form of gears and forming part of the drive train, and for providing various drive speeds thereof. The input or drive gears are fixed to rotate with the input shaft at all times when it rotates, while the driven gears are mounted for idle rotation on the output shaft, responsive to intermeshed drive by the drive gears, and the driven gears are only selected normally one at a time to be interconnected or frictionally coupled to the output shaft to impart output rotation to the driven output shaft from the input drive shaft. A novel shifter device utilizing circumferentially spaced, axially directed, laterally notched, slide members to control roller or ball members which are carried in transverse grooves on the output shaft and interposed between the shaft and driven gears thereon, is embodied therewith to selectively align preselected notch portions of the laterally notched slide members with a predetermined one or set of the transverse grooves, to permit the rollers to move into said lateral notches where there the radial distance between the I.D. of the selected driven gear and the depth of the groove is lessened or less than the diameter or effective radial dimension of the roller or ball member, to thereby form a servo-type camming frictional interengaging or coupling action between the selected change-speed gear and the output shaft, responsive to continuing relative rotation of the drive and driven gears. When the notches and transverse grooves are non-aligned, a neutral condition exists for the power transmission. The shifter comprises separate circumferentially spaced notched slides which seat in or between complementally formed splines on the output shaft, which slides are collectively attached to and actuated by a common actuator collar and suitable linkage mechanism.

17 Claims, 18 Drawing Figures

INVENTOR
JUNICHI GO
BY Wenderoth, Lind & Ponack
ATTORNEYS

INVENTOR
JUNICHI GO
BY Wenderoth, Lind & Ponack
ATTORNEYS

INVENTOR

JUNICHI GO

BY Wenderoth, Lind & Ponack
ATTORNEYS

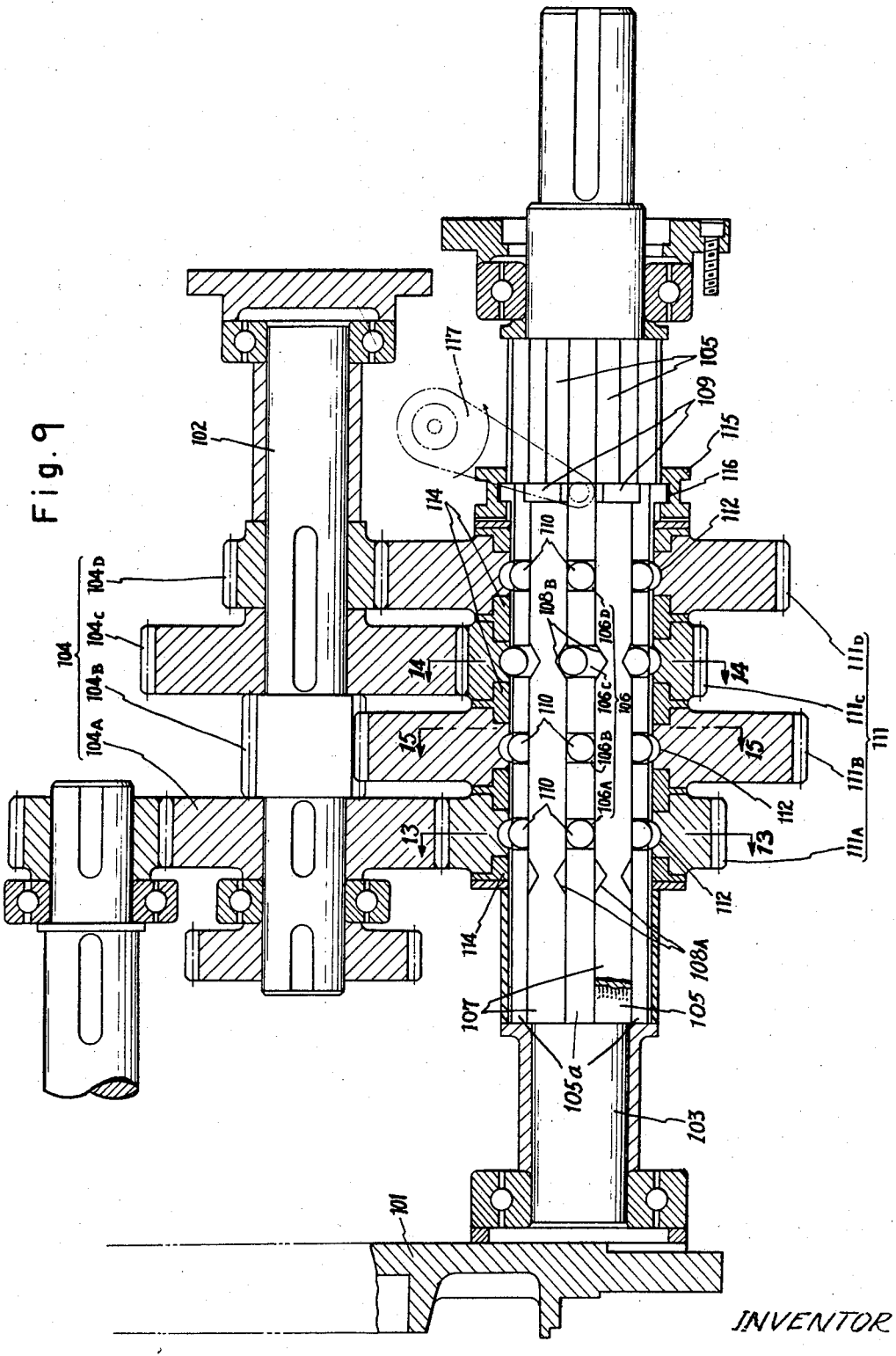

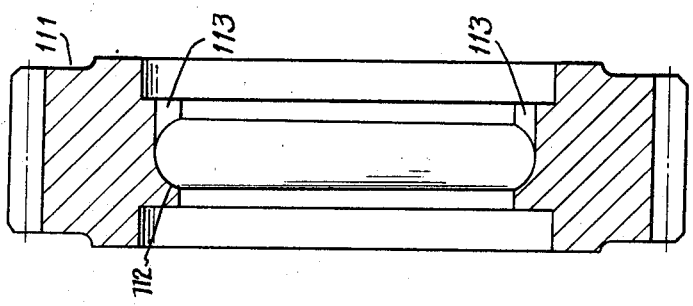
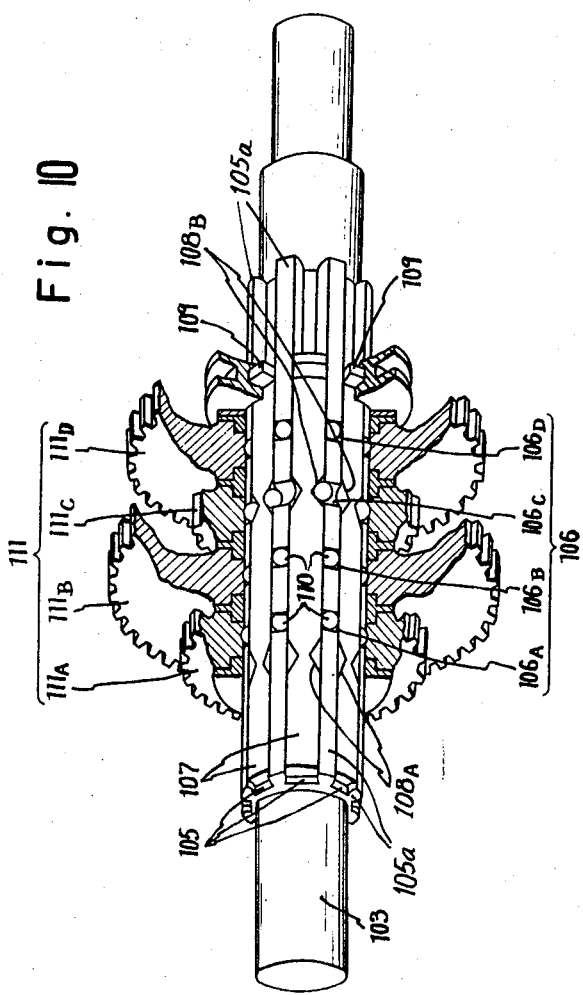
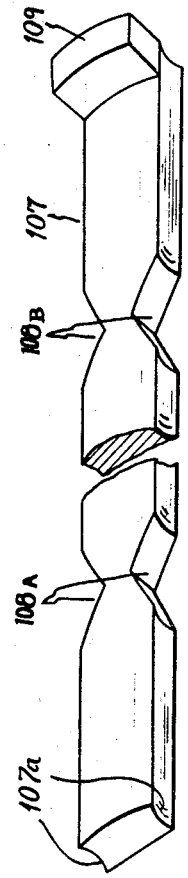

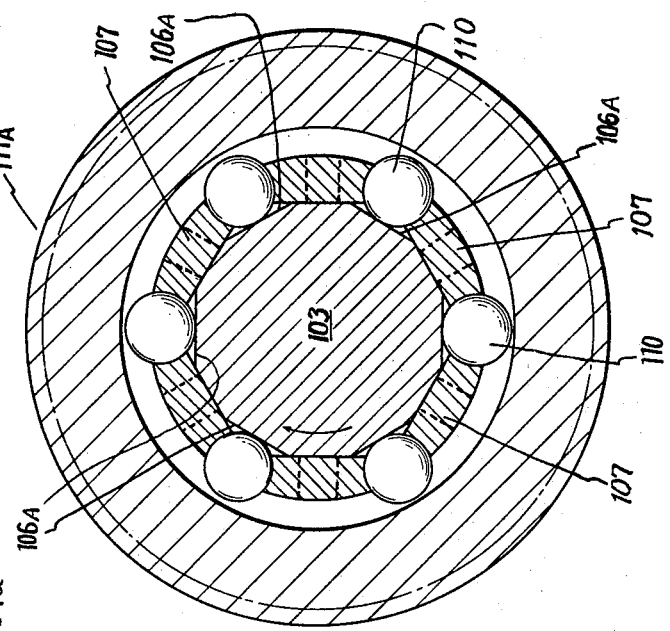
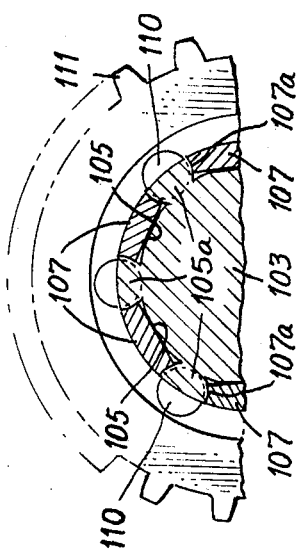
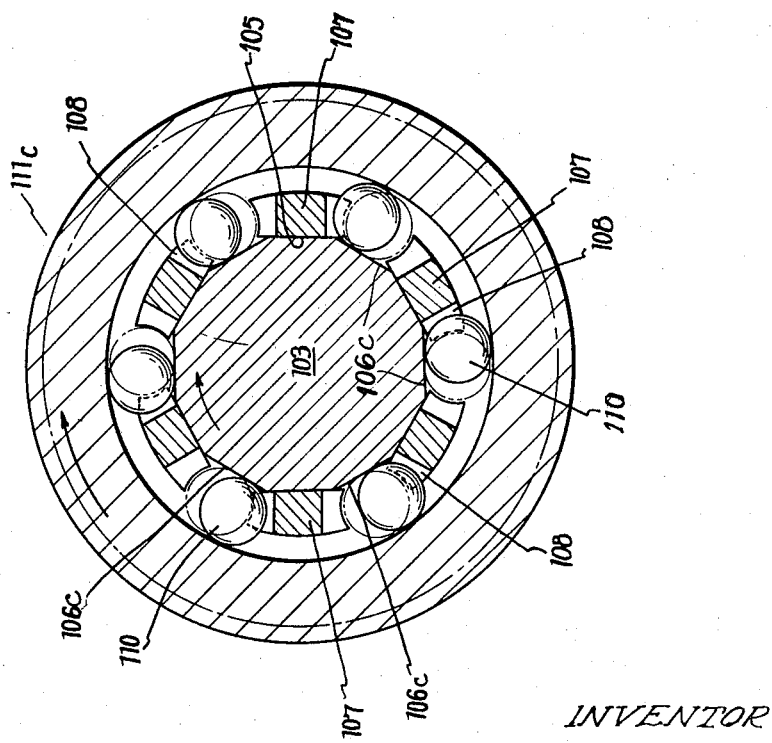
Fig. 13.
Fig. 15.
Fig. 14.

METHOD AND DEVICE FOR POWER TRANSMISSION TRANSFER

This application is a continuation-in-part of my application Ser. No. 859,665 filed Sept. 22, 1969, now abandoned.

This invention relates to the method and device for single step power transmission transfer which makes possible transferring drive of power transmission via rotary means including gears, pulleys, sleeves, etc., whether or not they are in rotary operation.

In the conventional transmission device which utilizes gear mechanisms, etc., the transfer device for changing the engaging positions of gears mostly uses shifts, or a shifter, etc., which selects one driven gear at a time and therefore, in its operation the transfer of gears could not be done in a single step. Moreover, by using dog clutch or snap key, etc., the transfer of gears could be made while in operation, but the former was limited to the two or more step type of transfer and the latter could not be applied to transmission of great powers. Consequently, its usage was extremely restricted.

The invention will be described in more detail as related to the illustrative drawings, in which:

FIG. 9 is a view similar to FIG. 1, but showing a further practical, modified embodiment of the power transmission transfer mechanism;

FIG. 10 is a perspective view partially in cross-section, showing the relationship between the interengageable driven gears and driven output shaft of the modified embodiment of FIG. 9, and its use of a plurality of collectively actuatable individual slide shifters in lieu of the slotted cylindrical sleeve type shifter body shown in FIGS. 1 and 2;

FIG. 11 is an enlarged perspective detail view of an individual actuator slide used in the modified embodiment of FIGS. 9 and 10;

FIG. 12 is an enlarged cross-sectional detail view of the general form of gears used in the modified embodiment shown in FIGS. 9 and 10, the I.D. of said gears being designed to receive and retain the engaging rollers;

Figure 1:
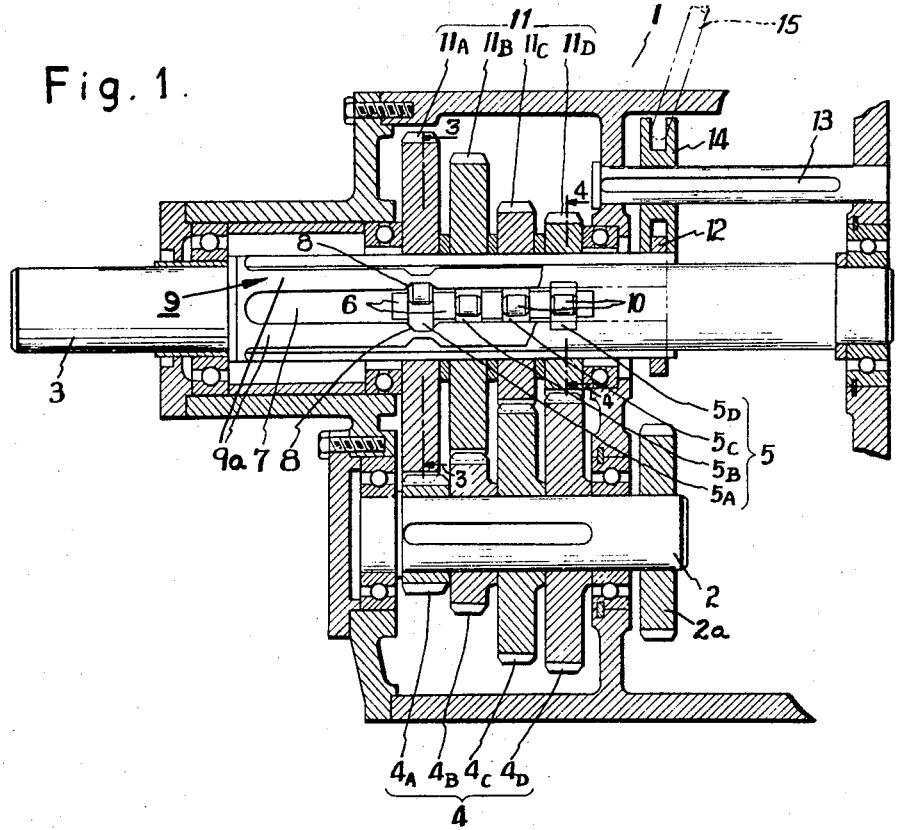
FIG. 1 is a longitudinal cross-sectional view with some parts shown in elevation, and showing one illustrative working example for the device of this invention.

FIGS. 13 and 14 are enlarged cross-sectional detail views taken respectively on lines 13—13 and 14—14 of FIG. 9; and FIG. 15 is a fragmentary cross-sectional detail view taken substantially on line 15—15 of FIG. 9.

More particularly this invention relates to a change speed device for a power transmission which preferably includes parallel drive and driven shafts, each having preferably a plurality of axially spaced different diameter, interengaging drive and driven members, respectively, forming part of a drive train, said members preferably being in the form of gears. Means are associated with the driven gears and driven shaft to be selectively interengageable to impart output rotation to the driven shaft from the input drive shaft, and is achieved by the following construction. The drive gears are fixedly mounted for rotation at all times on and with the drive shaft, while the other driven gears, as enmeshed with the drive gears, are mounted for free rotation on the driven output shaft responsive to drive rotation of said drive gears when the input drive shaft is rotating. The driven gears, therefore, idly rotate except for when any selected driven gear is frictionally engaged or coupled with the drive shaft by the following described shifter means. A plurality of both circumferentially and axially spaced, circumferentially directed recessed grooves are provided on the driven shaft transversely to the axial direction to underlay the driven gears, and are of varying depth as related to the I.D. of the gears, with the deepest part designed to provide fully recessed roller seating without gagement of the gear's I.D., to be described, while other less deep parts relative to the arcuate I.D. of the gears will permit preselected driving engagement thereof. The grooves may be provided by forming polygonal shaped cross-sections at the preselected, axially spaced, locations on the shaft at which the driven gears are positioned in overlying relationship thereto. Interposed between the inside diameter of the respective overlying gears, and the various grooves are rollers, balls or other suitable engagement-effecting means which in the preferred forms generally do not provide any anti-friction support for said gears on said shaft, although under certain circumstances and in closely controlled tolerance constructions, such might possibly be the case.

An axially slidable shifter device, which, in one preferred form, includes a plurality of axially elongated slide pieces, is mounted on the grooved shaft so that the slide pieces are disposed preferably in uniform, circumferentially spaced relation between the aforesaid circumferentially spaced transverse grooves; and, the slide pieces are provided with medially spaced notches corresponding generally to the number of gears mounted on said associated shaft. The notches are designed to selectively form extensions of the preselected transverse grooves for a related gear, one gear at a time, when the shifter is suitably actuated to align same, thereby permitting the roller member to move circumferentially into the aligned notch from the transverse groove to a condition where the radial distance between the I.D. of the associated gear and the transverse groove is less than the diameter or radially directed overall dimension of the roller member. This movement of the roller or rollers is initiated usually by gravity at least for part of the rollers whereupon when partial rotation is effected for said output shaft, the other rollers or balls will similarly move to the edges of their grooves to supplement the action and drive of the others. Under certain other possible constructions where the rollers and grooves are of predetermined relative sizes, it is conceivable that the lateral movement of the balls could be initiated at least in part by slight drag friction of the gears I.D. responsive to rotation of said gear thereabove while normally held centered within the deepest portion of said transverse grooves; and when in the less deep, circumferentially shifted position, the roller member effects a continuing or servo type camming action to effectively frictionally couple the I.D. of the selected gear with the driven shaft to thereby impart output drive rotation thereto.

The shifter device may also be in the form of individual slide pieces mounted separately in slideways between complementary formed spline portions on the shaft, with said slides being collectively actuated by their common connection, preferably by end flanges, to an actuating collar freely surrounding the shaft; or, said shifter device may be in the form of a longitudinally slotted, unitary cylindrical sleeve having longitudinally extended and circumferentially spaced slide-like portions, formed by the aforesaid longitudinal slots. The sleeve circumferentially overlays the driven shaft, being interposed between the shaft and the I.D. of the driven gears mounted thereon. The sleeve has an annular flange, preferably at one end, which cooperatively connects in a similar manner to the actuating collar aforesaid, and in both forms is such that relative rotation is permitted between said shifter device and said actuating collar. Selected axial movement of the shifter device then regulates the various speed changes of the power transmission between the range of its gears. The device has a neutral or non-driving condition effectable by recentering the roller or ball members into a central and/or deepest part of the respective axially spaced recessed transverse grooves whereby said rollers are precluded from being frictionally driven or cammed into engagement with any one of the gears. The offset notched portions of the elongated slotways may have different forms and axial spacings.

The illustrative working examples for this invention will now be explained in further detail in conjunction with the aforedescribed detailed drawings as applied to a change speed gear transmission mechanism, and wherein like reference numerals designate like parts throughout the several drawing figures.

Figure 2:
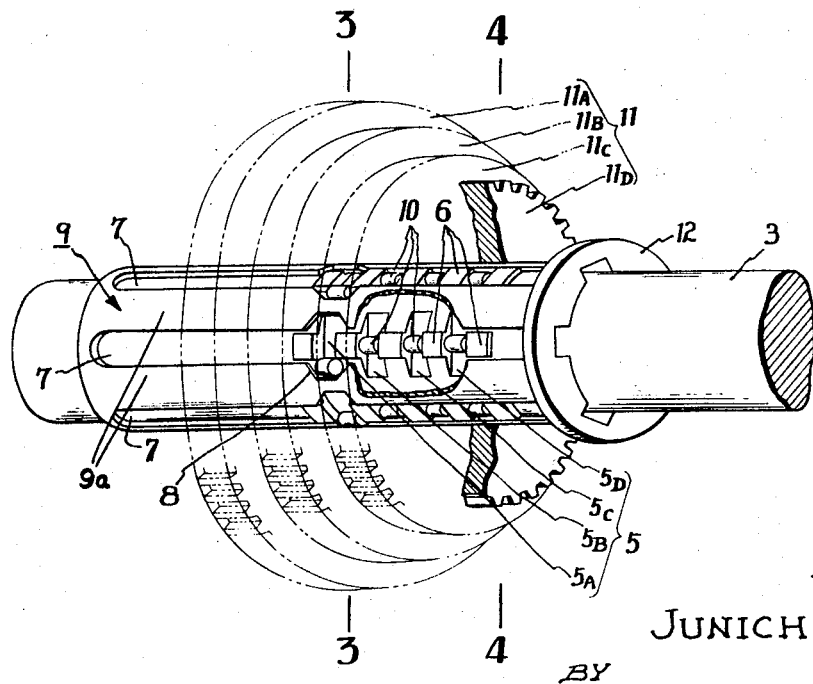
FIG. 2 is an enlarged perspective view of part of the invention showing the relationship between the driven output shaft and cylindrical sleeve type shifter body.
Figure 4:
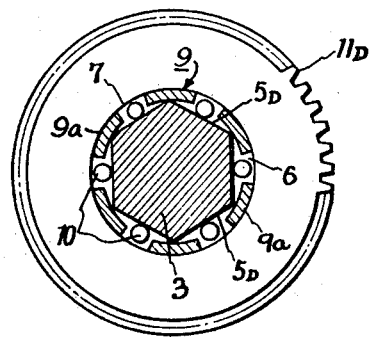
FIG. 4 is a similar cross-sectional view taken substantially on line 4—4 of FIG. 2.
Figures 4A, 4B:
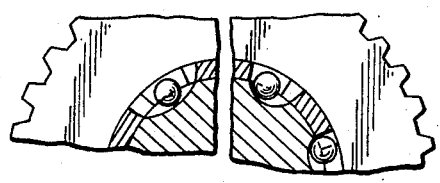
FIGS. 4a and 4b are fragmentary cross-sectional views of alternative forms of arcuate grooved recesses for the balls or rollers.

In FIG. 1 an input, drive shaft 2 and an output, driven shaft 3 are horizontally disposed in parallel within housing 1. The input shaft 2 is provided with a plurality of axially spaced drive gears 4A, 4B, 4C, and 4D, each having a different diameter and different number of teeth, and which gears are mounted for rotation with said input shaft at all times that it is rotating as by gear 2a (FIG. 1). As indicated more clearly in FIG. 2, the driven shaft 3 is provided with a plurality of sets of axially spaced, recessed transverse grooves 5A, 5B, 5C and 5D formed on its circumferential surface to receive antifriction, camming members to be described and disposed at several circumferentially and preferably uniformly spaced positions, each set thereof corresponding with the position of each of the aforesaid axially spaced drive gears 4A, 4B, 4C, and 4D, and over which grooves driven gears 11A, 11B, 11C and 11D are disposed for free rotation thereon. Radially projecting and axially spaced but aligned parts constituting spline pieces 6, are projected alternatively from between and adjacent the recessed transverse grooves 5 and are formed preferably integrally with shaft 3, and preferably at uniform circumferentially spaced positions thereon. A cylindrical sleevelike shifter member 9 includes elongated slide-like portions 9a separated by longitudinal slotways 7 which are formed to guide along the spline pieces 6, when said sleeve is shiftably mounted upon the outer circumference of the driven output shaft 3. The longitudinal slotways 7 have circumferentially directed extensions or lateral notches 8 formed in the generally medial portion thereof and extending in at least one or both opposite directions. The notches 8 have tapered or angled sides which diverge toward the slotways 7 and which are adapted to engage, at certain selected times, with suitable camming members such as balls or rollers 10 disposed within the recessed grooves 5 between projections 6. The said spline pieces 6 also align with and are complementally formed to seat in said longitudinal slotways 7 of sleeve 9, but do not extend radially therebeyond to any significant extent, but are preferably substantially flush with the outer periphery of the shifter sleeve 9. The spline pieces may extend only a very slight distance beyond the sleeve to provide a circumferentially spaced seat upon which the driven gears 11 are rotatively mounted, thereby reducing the friction of the I.D. of the gears upon the sleeve 9. The gears 11 enmesh with and are driven by the aforementioned drive gears designated 4A, 4B, 4C and 4D. Where members 10 are in the form of cylindrical rollers, the ends thereof are slightly beveled, as shown, to facilitate their cooperation and easier movement against the tapered sides of notches 8. The several rollers 10, balls or the like, may be respectively inserted into each of recessed grooves 5 through the longitudinal grooves 7 of the cylindrical sleeve 9. The plurality of transmission change speed driven gears 11A, 11B, 11C and 11D, are of different diameters and centrally mounted generally on the outer circumference of the cylindrical body 9, or splines 6, and are correspondingly disposed radially over the respective sets of rollers 10. The diameter of said rollers or balls 10 is such that when they are seated in the deepest, and preferably centered portion of the transverse grooves 5, as related to the I.D. of the overlying driven gears 11, that there is preferably a slight clearance, as shown in FIG. 4 (and 13), between the roller members and the I.D. of said gears. Accordingly, they do not necessarily or usually readily engage the interior circumferential surface or shaft aperture of the associated driven gear 11, and the slight clearance formed therebetween permits said gears 11 to idle freely on the said driven shaft. Even in the event where slight over tolerances exist whereby the rollers might not fully clear but rollingly engage the I.D. thereof, when the roller is trapped or confined, it merely rotates about its own axis to provide an anti-friction rotation of the superposed gear thereabout. In those cases of this latter possible form such condition would provide a slight drag-torque initiation of the balls into the lateral notches when so aligned. Only when a predetermined one or set of notches of the extended, expanded or notched section 8 of shifter sleeve 9 are aligned with a selected transverse groove 5 can there be a movement of the member 10 into a lateral corner of said groove 5, whereby either slight drag friction, as aforesaid, of related I.D. of said driven gear 11, or by gravity acting on certain rollers 10, causes them to move circumferentially toward a position where the radial clearance between said I.D. and base of the groove is much less than the diameter of the roller member 10, and the continuing frictional rotative drag of the I.D. on the roller frictional forces or cams it into continuously tighter engagement therebetween in a servo-like action, and thereby transmits only the rotational speed provided by the ratio of the selected drive and driven gear, to said driven output shaft 3.

By providing an annular flange or collar 12 at one end of the cylindrical sleeve body 9 in cooperation with a groove of an actuating sheave or ring 14 slidably mounted on a fixed shaft 13 disposed parallel to shaft 3 within the housing 1, said shifter sleeve body 9 is freely shiftable forwardly and backwardly coaxially with said driven shaft 3 responsive to operation of a lever 15 operatively interconnected with said actuating ring 14.

Figure 3:
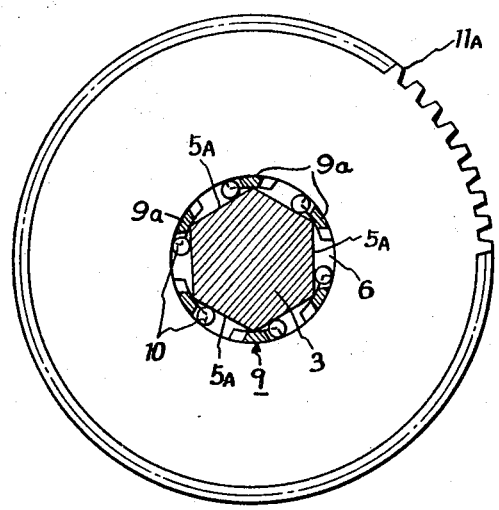
FIG. 3 is a cross-sectional view taken substantially on line 3—3 of FIG. 2, with certain parts shown in elevation.

In the illustrated example, first of all, by operating lever 15 and shifting the cylindrical sleeve 9 along the driven shaft 3, the position of the laterally extended or notched sections 8 of lengthwise grooves 7 can be made to correspond with any one of the selected driven gears 11, such as gear 11a in FIG. 1. In accordance with this manner of alignment, it is preferred that only one transverse set of grooves at a time, such as 5A in FIG. 1, is substantially fully uncovered, exposed, or extended by the selected positioning of the lateral notch 8 enabling roller 10 to be cammed or pushed into a corner responsive to the servo-like rolling action described hereinabove. Consequently, only a single selected driven gear, such as 11A, is thereby driven, one at a time, by intermeshing action with a selected one of the drive gears 4 and subsequently coupled to driven output shaft 3 via the camming of its roller members 10 (FIG. 3), with the other potentially driven gears 11B, 11C or 11D, as shown by 11D in FIG. 4, remaining free to rotate or idle around shaft 3 on the combined circumference of said projecting parts 6 and/or sleeve 9, and/or other roller members 10.

Therefore, it is also apparent that by the reverse axial shifting of the shifter sleeve 9 responsive to operation of lever 15, the roller 10 positioned within the extended notch section 8 is cammed or pushed out, by the angular or tapered sides of said notch, into the center or deepest part of its recessed groove 5A and again into longitudinal alignment with the longitudinal slotway 7, whereupon roller 10 becomes substantially disengaged from the shaft aperture or I.D. of the driven gear 11A, whereby power transmission therethrough is cut off and the said driven gear 11A idles freely like the others.

Further, if the same or another of the expanded sections or notches 8 is made to coincide with any other of the recessed grooves 5 by a further axial movement of said cylindrical shifter sleeve 9, only that further selected groove 5 is fully opened or aligned with the notch thereby again permitting the roller 10 therein to rotatively cam into engagement with the corresponding gear 11, in the same manner as described in the foregoing.

Accordingly, the rotational speed of the newly selected set of intermeshed gears is transmitted to driven shaft 3, with the rotational speed being able to be changed as desired.

A non-driving or neutral condition can be achieved by shifting the cylindrical sleeve 9 so that its laterally extended or notched sections 8 of the longitudinal grooves 7 are placed midway of the respective recessed grooves 5 so that all of the potentially driveable gears 11 are disengaged and remain free to idle without imparting power transmission to the driven shaft.

Due in part to the symmetrical form of the laterally notched extensions 8 of slotways 7, both forward and reverse rotational drive power may be transmitted equally well by this device.

A further distinctive feature and advantage of this invention is that, since the projecting key-like parts 6 are formed preferably integrally with the driven shaft 3 and cooperatively align or engage with the longitudinal groove 7 of the cylindrical sleeve 9, with the respective driven gears 11 supported in a freely rotational manner on the outer circumferential surface of sleeve 9 and/or spline parts 6, then the cylindrical sleeve 9 is never subjected to a twisting or undue eccentric action responsive to the addition of rotational force of an engaged driven gear 11 which might otherwise directly act upon the cylindrical sleeve body 9. Also, no overwork would accrue to the roller members 10 housed within the respective grooves 5 of the supporting output shaft 3, and further assuring that no damage of shaft and no slippage or eccentric rotations, etc. shall occur as a result of tolerance irregularities or other tightness of the respective roller members 10.

Figure 5:
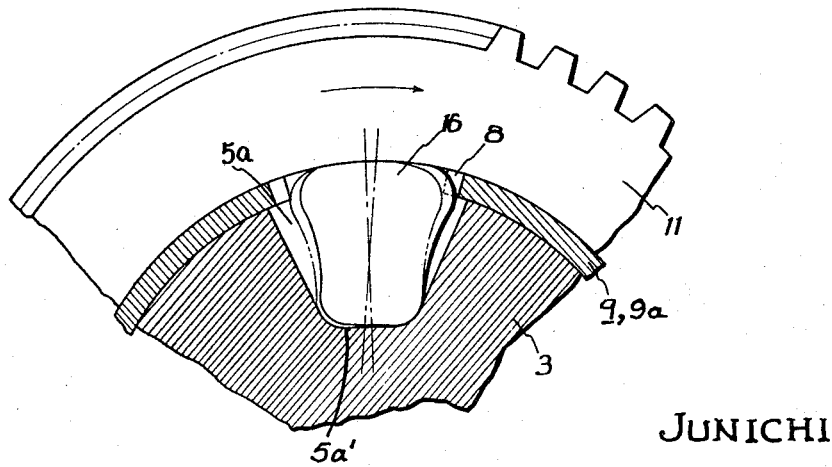
FIG. 5 is an enlarged fragmentary cross-sectional view showing a modified embodiment where interlocking is made by surface contact by means of a rockable joining medium for coupling together the driven gears and the driven shaft.

Without restricting the inventive concept to the aforedescribed embodiment, it is possible to utilize other various embodiments with different sleeve notch and roller configurations. For example, in the embodiment of FIG. 5, the form of the bottom surface of a recessed groove 5a on driven shaft 3 could be made into a slightly convex curved surface 5a' to correspond more to the shape of the modified roller or connecting medium 16 provided generally with a complementary slightly concave inner and convex outer circumferential surface. The outer arcuate surface of part 16 almost or only barely touches with the internal circumferential surface of the shaft aperture of gear 11, and by being so inserted within the modified respective recessed grooves 5a, a powerful self-serving rotational force can also be transmitted without any overwork.

Figure 6:
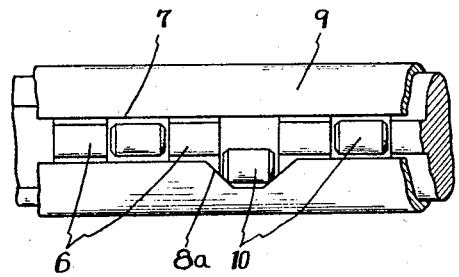
FIG. 6 is a fragmentary elevational perspective view illustrating another working example for the form of expanded grooves or notches used on the cylindrical sleeve type shifter body, as may be applied for a positive (forward) and negative (reversing) transfer device, and shown partially in perspective cross-section.
Figure 5A:
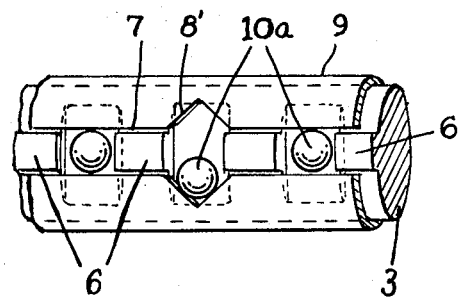
FIG. 5a is a fragmentary detail view of a further modified form of slotted cylindrical sleeve type shifter body.

Also, the shape of the lateral notched section 8 and of longitudinal slotways 7 of the sleeve body 9 may be more nearly that of a triangle shape 8', as shown in FIG. 5a, and also like that of section 8a as shown in FIG. 6, which is only opened or notched to one side of the grooves 7. In the latter instance, then the shifter device can effect a transmission of the rotational drive only in one direction, to output driven shaft 3.

Figure 7:
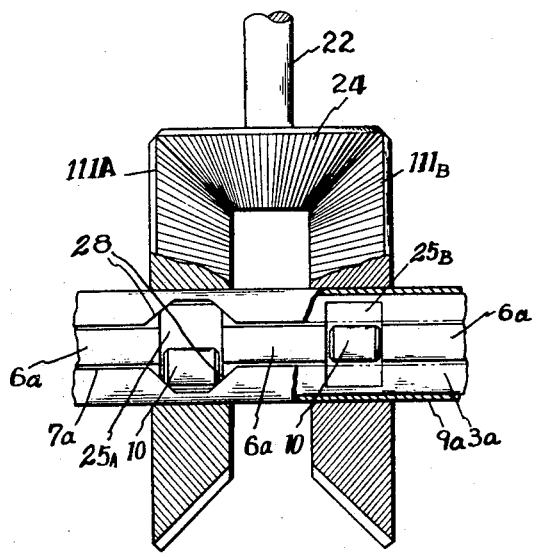
FIG. 7 is a view partially in a cross-section and partially in side elevation showing a further modified embodiment applicable for a positive (forward) and negative (reverse) driving device.

Further, as shown in FIG. 7, one pair of driven bevel gears 111A, 111B engaged with drive bevel gear 24 at the end of a drive shaft 22, is supported on similar spline-like projecting parts 6a of driven shaft 3, respectively, and the shifter sleeve 9a having the notched section 28 formed on longitudinal slotways 7 operates relative to the said driven shaft 3a via rollers 10 in grooves 25A and 25B, in the same manner as previously described, to selectively engage or disengage forward or reverse drive operation via one or the other of said bevel gears.

In the same type embodiment as in FIG. 7, a special expanded or extended notch 28, similar to 8a as shown in FIG. 6, may be opened into one side only of slotway 7a, and corresponding with both driven bevel gears 111A and 111B, for a modified form of transferring either forward or reverse drive by the respective gears.

Figure 8:
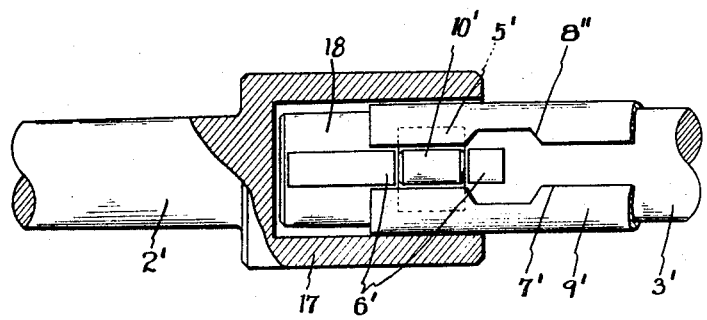
FIG. 8 is a view partially in elevation and partially in cross-section showing a further modified embodiment for clutching together two coaxially aligned shafts by the same principle.

FIG. 8 represents a further modified embodiment wherein rotary power transmission between coaxially aligned drive shaft 2' and driven shaft 3' is readily achieved to intermittently or continuously clutch the concentrically disposed annular socket flange 17 and driven shaft end 18 provided at the adjacent ends of said shafts, by utilizing the same general construction of recessed groove 5', projecting spline 6', roller 10' and axially shiftable sleeve 9' with notch 8'', all operating in the same manner described for the preceding embodiments.

Proceeding to the more detailed description of another preferred practical embodiment, reference will now be made to FIGS. 9–15. FIG. 9 shows the same general component arrangement as that of FIG. 1, except it will be noted the position of the input 102 and output 103 shafts has been inversed and reversely directed therein. Unlike the first-described embodiment, there is no unitary cylindrical shifter sleeve, but instead output shaft 103 is provided with a plurality of equally spaced longitudinal slotways 105 defining splines 105a (FIGS. 9, 10 and 15) therebetween, and individual complementally formed notched slides 107 (generally corresponding to parts 9a of FIGS. 1 and 2) are separately placed within said slotways 105, more clearly seen in FIGS. 10 and 13–15. The output shaft 103 is provided with a plurality of sets of axially spaced, transverse recessed grooves 106A, 106B, 106C and 106D, generally corresponding to the similar recessed grooves 5A–5D in the first embodiment. These grooves may also be provided by a series of flat chordal cuts or recesses forming a polygonal cross-section therethrough, as seen in cross-sectional FIGS. 13–15, and previous FIGS. 3 and 4. It is apparent that these transverse grooves 106 are disposed such as to also provide a diminishing radial distance from the base of their opposite ends relative to the I.D. of the respective driven gears 111A–111D which overlay the grooves, as compared with the radial distance from the center of the groove relative to the same I.D. of the gear. In this manner, the preferred ball bearing type rollers 110 operated on the same servo-type principle as described for rollers 10 of the other embodiments, to thereby couple the selected gear to the output shaft.

The slides 107 may be seen in greater detail in FIG. 11, where it is noted the side edges of the slide are concavely formed at 107a to complementally fit between the splines 105a having convexly shaped side walls. Preferably the concavity of the slide side walls 107a is made to be substantially complemental to the radius of the balls 110, as seen better in FIGS. 13 and 14, so that said balls are more stably supported but freely confined within the raceways constituted by such a construction. At predetermined positions intermediate the ends of said slides, similar lateral, angled notches 108 are provided strategically so that, for example, in the illustrated transmission having the four drive gears 104A–104D mounted for rotation at all times on the input shaft 102, and enmeshed with four corresponding driven gears 111A–111D freely rotatably mounted on the output shaft 103, two sets of notches 108A and 108B (FIGS. 10 and 11) will suffice so that the notches 108A, on the respective slides, will selectively cooperate with the transverse grooves and balls of gears 111A and 111B, while the other set of notches 108B selectively cooperate alternately with gears 111C and 111D. In the arrangement shown in FIGS. 9 and 10, the slots 108B are disposed in association with gear 111C, and the spacing of the slots is such that when the slides 107 are next shifted to the right, neutralizing the drive through said gear 111C, the notches 108A of the slides then become aligned with the gear 111A. Further shifting movement to the right next aligns notches 108B with gear 111D, and subsequently the notches 108A with gear 111B, in this alternate manner.

Depending upon the number of gears of the transmission, the number of notches provided in the sides of the slides will vary, and the distance between them is computed in a multiple of odd numbers of the pitch between the gears by equally dividing the respective distances between the transverse recessed grooves. Because both groove-expanding or extending notches 108A and 108B are not intended to be simultaneously aligned with two corresponding transverse grooves of the driven shaft 103, then control of the rotational shifting or coupling can be effected by moving the slide pieces 107 only a one-half pitch or approximately one half the distance between the preferably uniformly spaced transverse grooves and gears.

It is apparent that when the slide notches are selectively aligned with a predetermined one of the gears and its underlying transverse groove, the ball therein moves circumferentially into the notch to effectively couple the rotating driven gear to impart the drive given thereto by the corresponding drive gear, to the output shaft.

Each of the gears 111A–111D in this embodiment is supported primarily upon bearing rings 114 which are mounted upon the exterior surface of the output shaft 103, rather than directly upon the ball bearings 110 during their idle rotation. FIG. 12 shows a cross-sectional view whereby the I.D. of the typical gear 111 is provided with a raceway 112 and openings 113 through which the ball bearings are inserted into said raceway.

It is apparent from the foregoing that an improved power transmission or drive device has been evolved by the various kinds of application examples described. However, since in this invention the transferring of transmission ratios or drive speed is performed by the combined use of shifting rollers, etc. on the said driven shaft in cooperation with the sliding of the cylindrical sleeve body 9 or of collective slides 107 thereon, it is to be understood that the device is not to be limited to the illustrative cases of the gear transmission mechanism, and the clutching power transmission mechanism between two coaxially aligned shafts, inasmuch as it could be extensively applied as the transfer device of rotation transmission mechanisms for multiple shafts which are provided with friction, gear, belt pulley, coupling and other transmission members for various friction transmission mechanisms including belt transmission mechanisms, etc. Also, while the illustrative examples were made in cases where the transferring was all performed on the driven shaft, it could be equally well performed on the drive shaft with the same effectiveness, as well as being applicable to both shafts.

What is claimed is:

1. Apparatus for effecting power transmission transfer from a rotary drive input shaft to a rotatably driven output shaft, comprising:
   a. a transmission support housing;
   b. a rotary input drive shaft and a rotatable driven output shaft mounted in parallel in said support housing;
   c. a plurality of different diameter rotary drive members axially spaced upon and connected to and for continuous rotation with said input drive shaft;
   d. a like plurality of different diameter driven members having means for freely mounting same in an idle manner on said driven shaft, said driven members being mounted thereon in a predetermined complemental sequence to and in interengaging relation with the respective drive members; and
   e. means including tapered, transverse groove and related wedging or locking means, and selectively actuatable, axial directed, laterally notched shifting means in cooperation therewith interposed between said output driven shaft and the driven members overlying said groove and wedging means as mounted thereon for selectively coupling a predetermined set of engaged drive and driven members with said output shaft and thereby imparting the rotation of the drive shaft to that of the output driven shaft;
   f. said selectively actuable shifting means of paragraph (e) further including a plurality of longitudinally extended grooves and lands forming circumferentially spaced, axially directed, splines on the outer periphery of said output driven shaft and radially underlaying said plurality of freely rotatable driven members mountable thereon;
   g. said splines being longitudinally interrupted by a plurality of axially spaced transverse slots or grooves constituting sets of the transverse tapered grooves formed in circumferential alignment around said output shaft to coincide radially with the position of said respective overlying rotatable driven members, and said grooves being considered tapered by their formation such that the base thereof preferably at its opposite ends provides a diminishing radial distance therefrom relative to the I.D. of the respective overlying rotatable driven member, as compared with the corresponding radial distance from the intermediate deepest part of said groove;
   h. means supporting said driven rotatable members on said shaft so that the I.D. of said members is radially spaced outwardly of said splines;
   i. said wedging means of paragraph (e) include a wedging member inserted in each of said transverse tapered grooves, and each wedging member being of a cross-sectional dimension greater than the radial dimension of said groove depth, but slightly less than that between the base of said groove and the I.D. of said overlying rotatable member when said wedging member is substantially centered or retained in a deepest portion thereof relative to the I.D. of said overlying rotatable member;
   j. said shifting means of paragraph (e) further including a plurality of elongated slide members having parallel opposed longitudinal side edges, and disposed complementally to fit for relatively sliding movement in an axial direction between said circumferentially spaced splines of paragraph (f); each slide member having axially spaced sets of opposed lateral notches formed therein with the notches being of a size to at least partially receive said wedging members therein when a predetermined set thereof is selectively aligned with the corresponding set of transverse grooves and wedging means;
   k. means for collectively shifting said slide members between a non-operative power transmitting position, whereby
      1. when in the neutral position the slides are positioned so that none of the sets of lateral notches are in circumferential alignment with the transverse grooves and the wedging members are retained by the opposed parallel slide sides in a non-wedging deepest portion of said grooves so as to not engage the I.D. of said overlying rotatable driven members and
      2. when in the operative power transmitting position a selected set of said lateral notches are selectively aligned with the transverse grooves and wedging members of a predetermined one of said overlying driven members; and
   l. whereby in the latter condition said wedging members are circumferentially moveable toward and at least partially into said lateral notches whereupon due to the diminishing radial distances between them and the I.D. of said overlying driven member, said wedging members become compressed or wedged into tight frictional interengagement with the I.D. of said member by a continuing servo-like camming action of the interrelated components responsive to continuing drag torque by the continuing rotation of the rotative drive part, on the input shaft, in engagement with its associated driven part relatively engaged with said wedging member, whereby the rotary power of the input drive shaft is transferringly imparted to the output driven shaft.

2. Power transmission means as defined in claim 1, wherein said wedging means are in the form of spherical ball members.

3. Clutching apparatus for effecting power transmission transfer from a rotary drive input shaft to a rotatably driven output shaft, comprising:
   a. a transmission support housing;

b. a rotary input drive shaft and a rotatable driven output shaft mounted in parallel in said support housing;

c. a plurality of different diameter rotary drive members axially spaced upon and connected to and for continuous rotation with said input drive shaft;

d. a like plurality of different diameter driven members having means for freely mounting same in an idle manner on said driven shaft, said driven members being mounted thereon in a predetermined complemental sequence to and in interengaging relation with the respective drive members; and e. means including tapered, transverse groove and related wedging or locking means, and a plurality of individual but collectively actuatable, axial directed, laterally notched slide members disposed in cooperation therewith for limiting circumferential or lateral displacement of said wedging means, and interposed between said output driven shaft and the driven members overlying said groove and wedging means as mounted thereon, and having means operatively connected with and for collectively shifting said slide members for selectively coupling a predetermined set of engaged drive and driven members with said output shaft and thereby imparting the rotation of the drive shaft to that of the output driven shaft.

4. Power transmission means as defined in claim 3 wherein said transverse groove means comprise a plurality of the transverse grooves formed in predetermined circumferential and longitudinally spaced relation on said driven output shaft, and corresponding to the plurality of driven members mounted on said output shaft, and said wedging or locking means comprise a ball shaped roller member in each of the transverse grooves, whereby responsive to selective shifting of said slide members a predetermined one of the lateral notches of said slide members is aligned with one of said transverse grooves of said output shaft whereby responsive to a combination of gravity and rotary drag torque between the predetermined one of the relatively rotating normally freely idling driven members and said output shaft, the ball shaped member therein is moved in a wedging manner to effect said selective coupling of said engaged drive and driven members to achieve the power transmission from said input drive shaft to said output driven shaft.

5. A power transmitting clutching device comprising in combination an axially extended rotatable shaft member having an axially spaced series of transversely directed pocket-like notches, wedging members in said pockets, said wedging means limited as to axial movement by wall means of said pockets but adapted to move laterally and slightly radially within said pockets; a plurality of rotatable members mounted for selectively free relative rotation upon or concurrent rotation with said shaft member and disposed in outwardly radial adjacent alignment with said pockets and wedging members, a plurality of individual longitudinal slide members axially slidable in peripheral grooves provided on said rotatable shaft and interposed between said shaft and rotatable members mounted thereon, said slide members having predetermined axially spaced notches in the lateral edges to accommodate said wedging members when moved in their wedging positions, said notches having oppositely angled wedge- member-deflecting end surfaces to directly engage the wedging members and force same out of their wedging positions responsive to predetermined longitudinal movement of said slides, means operatively engaged with and for collectively actuating said slide members a predetermined axial amount to effect selective clutching or coupling of a predetermined one of said rotatable members for concurrent rotation with said rotatable shaft, and also for subsequently declutching said rotatable member.

6. Power transmission transfer apparatus as defined in claim 1, wherein the respective series of transverse grooves, wedging members, radial projections and longitudinal slotways are disposed in substantially circumferentially equally spaced manner.

7. Power transmission apparatus as defined in claim 1 wherein said tapered transverse grooves are provided with arcuate inner peripheries.

8. Power transmission apparatus as defined in claim 1 wherein the tapered transverse grooves are provided with generally flat inner surfaces which may form a polygonal shaped cross-section through said shaft, and are considered tapered by reason of their relationship to the arcuate outer periphery of the shaft in which they are provided, and to the arcuate inside shaft-mounting diameter of the overlying driven members mountable on said shaft.

9. Apparatus as defined in claim 1, wherein the rotary drive and driven members are in the form of intermeshing gears.

10. Apparatus as defined in claim 1, wherein the rotary drive and driven members are in the form of intermeshing gears; said wedging members being of the ball roller type; and wherein said driven gears are provided on their I.D.'s with complementary formed raceways having related insert passages for receiving said ball rollers during assembly thereof.

11. Apparatus as defined in claim 1 wherein the means of paragraph (k) include coextensive radially extended projections on said slide members, means slidably encircling at least a portion of each projection thereof to permit relative rotation as required, and lever shifting means operatively connected with said encircling means to impart collective sliding movement of said slides between neutral and operative positions therefor.

12. Apparatus as defined in claim 1 wherein the slide members and splines of the output shaft are formed with complementally interengaging convex-concave longitudinal sidewalls to facilitate retentive assembly thereof.

13. Apparatus as defined in claim 1, wherein the axial spacing between each set of opposed lateral notches of the slides are such as to permit each set by the selective shifting of said slides to cooperate with a plurality of at least two sets of said tapered groove and wedging members and their related driven rotatable drive members.

14. Apparatus as defined in claim 13 wherein said sets of axially spaced lateral notches include at least two, with the axial spacing therebetween being a multiple of the equally divided distance between the transverse tapered grooves, and such that said sets of lateral notches each cooperate alternately with adjacent sets of said transverse grooves and wedging members therein responsive to the selective axial shifting thereof.

15. Apparatus as defined in claim 13, wherein the axial spacing between sets of the lateral notches corresponds to an odd number multiple of the axial or pitch distance between the plurality of sets of corresponding rotary drive and driven members.

16. Apparatus as defined in claim 1 wherein the wedging means includes a non-circular wedging piece having generally radially outwardly directed convexly arcuate outer and concavely arcuate inner surfaces, and said tapered transverse grooves include a complementally convexly arcuate inner or base surface having a radius similar to and for complemental cooperation with said concavely arcuate inner surface of said non-circular wedging piece.

17. Apparatus as defined in claim 16 wherein said non-circular wedging piece is generally of tapered quad-shape formation as seen in radial elevation or cross-section, with the innermost or base side being the lesser dimension and having rounded base corners interconnected by said arcuate inner or base side, and being of predetermined proportions whereby when it is moved by gravity, as well as by separate drag rotation of said freely rotatable driving member idling over said taper-slot-carried wedging piece, such movement causes said wedging member to tend to rotate about a rounded base corner seating in said taper slot and thereby lifting and camming said wedging member into a position of continuing tightening engagement with the corresponding driving member thereabout responsive to registry of the transverse circumferential slot of said actuating sleeve over said selected transverse groove and wedging means.

* * * * *